United States Patent [19]
Grinstead et al.

[11] Patent Number: 4,976,866
[45] Date of Patent: Dec. 11, 1990

[54] CONCENTRIC TUBULAR MEMBRANE DEVICE AND PROCESS USEFUL IN ION EXCHANGE OR ABSORBENT PROCESSES

[75] Inventors: Robert R. Grinstead; H. Hunter Paalman, both of Walnut Creek, Calif.

[73] Assignee: The Dow Chemical Company, Midland, Mich.

[21] Appl. No.: 332,927

[22] Filed: Apr. 3, 1989

[51] Int. Cl.⁵ ............................................... C02F 9/00
[52] U.S. Cl. ................................... 210/638; 210/663; 210/669; 210/256; 210/266
[58] Field of Search ............... 210/638, 663, 669, 678, 210/688, 692, 256, 266, 275

[56] References Cited

U.S. PATENT DOCUMENTS 4,591,439  5/1986  Grot ..................................... 210/638
4,647,380  3/1987  Dasgupta ............................ 210/638
4,816,161  3/1989  Olness et al. ........................ 210/638

Primary Examiner—Ivars Cintins

[57] ABSTRACT

The invention is a concentric microporous tubular membrane device containing ion exchange or absorbent particles within the annular region formed by the concentric microporous tubular membranes. The device is useful for carrying out ion exchange or absorbent processes such as scavenging metals or organics from wastewater.

23 Claims, 1 Drawing Sheet

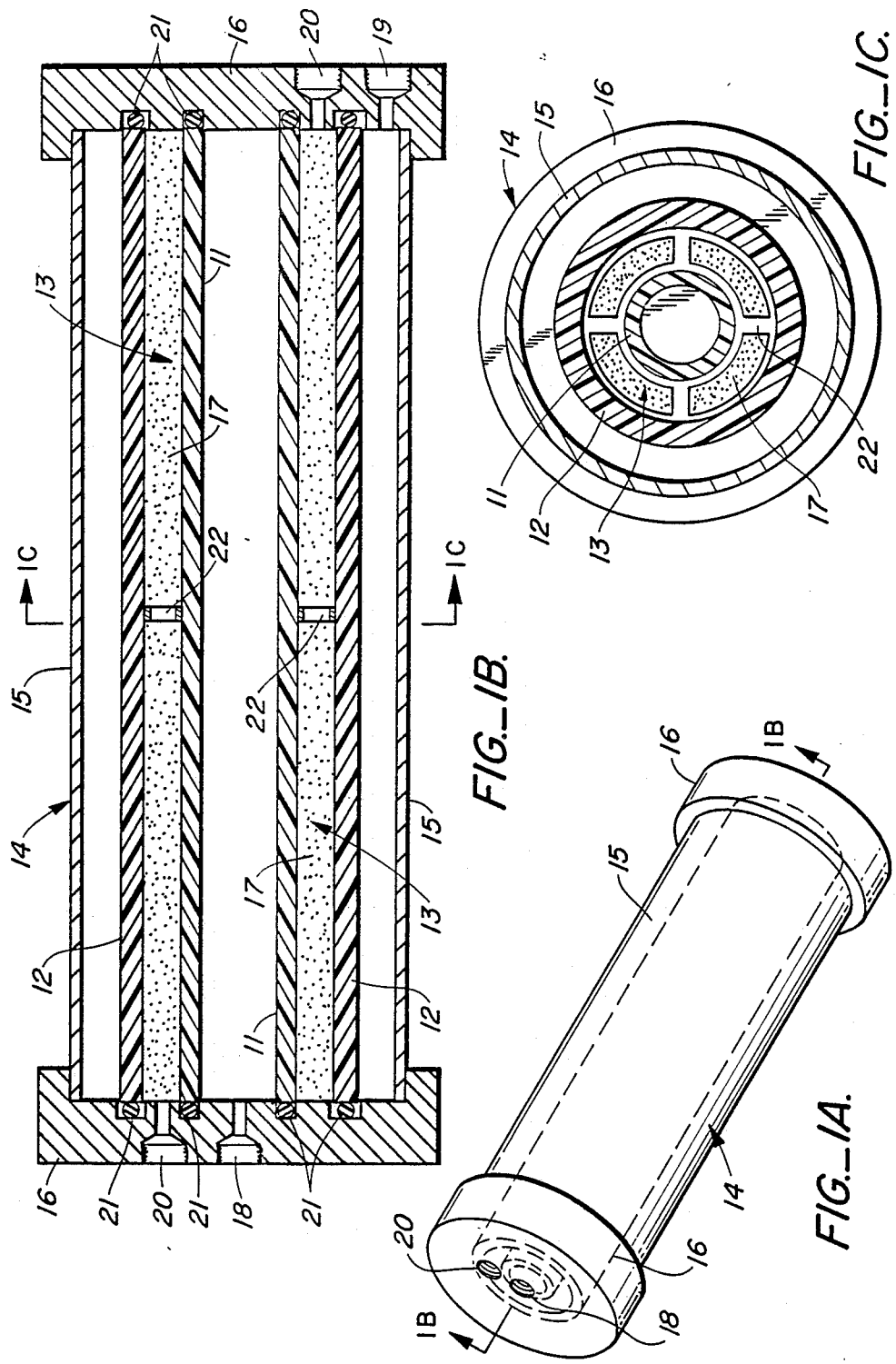

CONCENTRIC TUBULAR MEMBRANE DEVICE AND PROCESS USEFUL IN ION EXCHANGE OR ABSORBENT PROCESSES

BACKGROUND OF THE INVENTION the invention relates to a concentric tubular membrane device useful in carrying out ion exchange or absorbent processes.

Liquid streams often contain undesirable dissolved impurities or contaminants which may be removed by ion exchange or absorbent processes. For example, industrial wastewater effluents may contain metals such as copper, chromium, zinc, nickel, cadmium, and lead which environmental regulatory agencies mandate must be removed from industrial effluents prior to discharge. Wastewater or groundwater may require treatment due to contamination by various organic compounds such as halogenated hydrocarbons or pesticides which pose environmental or health hazards. Industrial process water may require purification prior to use because of the presence of compounds such as calcium and magnesium sulfates and bicarbonates which cause scaling and fouling of plant equipment such as boilers. Conventional ion exchange resins or absorbents such as activated carbon are frequently used to remove such impurities or contaminants from water.

conventional equipment used for carrying out ion exchange or absorbent processes consists of large tanks containing ion exchange or absorbent particles of about 16 to about 50 mesh U.S. Sieve Series ASTM E-11-61 (about 1.2 to about 0.3 millimeters in diameter) supported on screens, beds of sand, or other porous material possessing smaller openings than the diameter of the particles. Ion exchange or absorbent bed depths of several feet are commonly used. The limiting kinetic step in such processes is usually the rate at which the absorbing compound can diffuse from the liquid to the surface of the ion exchange or absorbent particles and then into the particles themselves. Finer, that is, smaller, particle sizes allow the diffusion step to proceed more rapidly by reducing the distance through which the absorbing compounds must diffuse. However, as the particles are reduced in size, the pressure drop across such beds becomes impractically high.

What is needed is an ion exchange or absorbent device and process for treating large volumes of liquid containing metals and/or organics in which the bed depth of ion exchange or absorbent particles is reduced and the particle size is reduced, so that the pressure drop across the bed may be maintained at practical levels while increasing the diffusion rate of the absorbing compounds through the bed by reducing the particle size. Reduction in particle size requires a simultaneous increase in mesh number of the bed supporting surface to prevent loss of ion exchange or absorbent particles. Furthermore, it is desirable to protect the upper layer of a shallow particle bed from turbulence created by the liquid being treated in order to prevent physical disruption of bed uniformity which can cause undesirable channelling and uneven distribution of the liquid being treated through the bed.

SUMMARY OF THE INVENTION

The invention is a membrane separation device useful for carrying out an ion exchange or absorbent process comprising:

A. a housing comprising a case and two endplates;
B. a first microporous tubular membrane;
C. a second microporous tubular membrane wherein the first tubular membrane is concentrically situated inside of the second tubular membrane such that an annular region between the first and second tubular membranes is formed;
D. fine size ion exchange or absorbent particles disposed within the annular region formed by the first and second concentrically situated tubular membranes;
E. a means for introducing a feed fluid/withdrawing treated fluid to/from the inside of the first tubular membrane;
F. a means for withdrawing treated fluid/introducing feed fluid from/to the outside of the second tubular membrane;
G. a means of sealing the first and second tubular membranes to the inside surface of the housing; and
H. optionally an inlet and outlet means for flushing the annular region formed by the first and second concentrically situated tubular membranes.

The concentric tubular membrane device of this invention utilizes fine size particles and shallow bed depths to increase the diffusion rate of the absorbing compounds through the bed while maintaining the pressure drop across the bed at practical levels. The device is useful for economically treating large volumes of liquid containing metals and/or organics.

BRIEF DESCRIPTION OF THE DRAWING

FIG. 1A, 1B and 1C illustrate a preferred embodiment of the membrane device of this invention.

DETAILED DESCRIPTION OF THE INVENTION

The microporous tubular membranes useful in this invention possess a porosity such that flux of the liquid to be treated through the membranes occurs at reasonable rates while the membranes maintain sufficient mechanical integrity under conditions of use. The porosity of the membranes is preferably between about 20 and about 80 percent, more preferably between about 30 and about 70 percent. The pore size of the membranes is less than the particle size of the ion exchange or absorbent particles used in order to prevent loss of such particles through the membranes. The pore size of the membranes is also such that the pressure required to permeate liquid through the pores is not unreasonably high. Preferred pore sizes are about ¼ to about ¾ of the particle size diameter. Preferred pore sizes are in the range of about 0.1 to about 50 microns; more preferred pore sizes are in the range of about 0.5 to about 25 microns. The flux of liquid through such membranes is preferably at least about 3,000 gallons/square foot/day (GFD) at about 25° C. and about 10 psig, more preferably at least about 10,000 GFD at about 25° C. and about 10 psig.

The microporous tubular membranes useful in this invention are fabricated from materials which possess sufficient temperature and chemical resistance for the particular application of interest. Preferred microporous membrane materials include polyolefins such as polyethylene, polypropylene, and poly-4-methyl-pentene-1; polysulfones; polyethersulfones; polyetherketones; fluoropolymers such as tetrafluoroethylene, polyvinylidene fluoride, and perfluorosulfonic acid; polyvinylidene chloride; acrylic polymers; polyamides;

polyesters; polycarbonates; polyimides; cellulosic polymers; and the like. The fabrication of such membranes is well known in the art.

The microporous tubular membranes useful in this invention possess a thickness sufficient to provide mechanical integrity under conditions of use while being thin enough so that flux of liquid through the membrane is not intolerably impeded. Such membranes may optionally be supported by screens or other porous support means. The thickness of the membranes useful in this invention is preferably between about 0.1 and about 5 millimeters, more preferably between about 0.1 and bout 1 millimeter. The diameters of the microporous tubular membranes are chosen so as to provide a suitable bed depth for the ion exchange or absorbent particles as defined by the annular region formed by the two concentric tubular microporous membranes. The outer diameter of the first tubular (smaller) membrane is preferably between about 0.25 and about 12 inches, more preferably between about 2 and about 10 inches; the inner diameter of the second tubular (larger) membrane is preferably between about 0.33 and about 14 inches, more preferably between about 2 and about 13 inches. The length of the tubular membranes is such as to provide for a sufficient ion exchange or absorbent bed capacity for the volume of liquid to be treated without generating unreasonably large pressure drops for liquid distribution down the length of the membranes. Preferred membrane lengths are between about 1 and about 10 feed, more preferably between about 3 and about 8 feet.

The first tubular membrane is concentrically situated within the second tubular membrane such that an annular region is formed between the first and second tubular membranes. The annular region spacing between the two concentrically situated tubular membranes is preferably between about 2 and about 50 millimeters, more preferably between about 2 and about 25 millimeters, even more preferably between about 4 and about 15 millimeters. Optional porous spacer(s) may be employed to help maintain uniformity of the annular region spacing. The two concentric tubular membranes are contained within a housing comprising a case and two endplates. The tubular membranes are sealed to the housing (case and/or endplates) to provide liquid-tight seals. The means of sealing the tubular membranes to the housing may be permanent, such as by use of an elastomer, a thermoplastic resin, or a thermoset resin with sufficient adhesion to the housing and membrane materials to provide a liquid-tight seal. The means of sealing the tubular membranes to the housing is preferably removable so as to enable access to the tubular membranes for cleaning and/or replacement of the tubular membranes within the housing in the event the membranes are fouled or damaged. Such removable sealing means includes use of O-rings and/or gaskets.

The annular region formed by the first and second concentrically situated tubular membranes is filled with fine size ion exchange or absorbent particles. The type of ion exchange or absorbent particles employed depends upon the application of interest. For example, to remove metals from aqueous streams, preferred ion exchange or absorbent materials include chelating ion exchange resins such as Chelex ® 100 ion exchange resin (trademark of Bio-Rad Corporation) and Amberlite ® IRC 718 ion exchange resin (trademark of Rohm & Haas Company). To remove organics from aqueous streams, preferred ion exchange or absorbent materials include activated carbon, weakly basic and strongly basic ion exchange resins. To remove calcium and magnesium sulfates and bicarbonates, preferred ion exchange or absorbent materials include Dowex ® 50 ion exchange resin (trademark of The Dow Chemical Company) and other strongly acidic ion exchange resins. The manufacture of such ion exchange or absorbent materials is well known in the art.

The ion exchange or absorbent particles used may posses irregular or regular shape. Such particles are preferably spherical. The size of such particles is larger than the pore size of the microporous membranes used and small enough so that diffusion of the absorbing compounds through the particle bed occurs at reasonable rates. The fine size ion exhange or absorbent particles preferably possess a size between about 10 and about 100 microns (about 1250 to about 140 mesh), more preferably between about 20 and about 74 microns (about 625 to about 200 mesh).

The membrane device includes a means for introducing a feed fluid/withdrawing a treated fluid to/from the inside of the first tubular membrane and a means for withdrawing a treated fluid/introducing a feed fluid from/to the outside of the second tubular membrane. The membrane device optionally includes an inlet and outlet means for flushing the annular region formed by the first and second concentrically situated tubular membrane so that the ion exchange or absorbent particles contained within the annular region may be regenerated in place or removed and replaced.

Flushing of the annular region formed by the two concentric tubular membranes may be accomplished by passing a sufficient volume of liquid at a sufficient pressure through the annular region via the optional inlet and outlet means for the annular region in order to remove the ion exchange or absorbent particles. Liquid for flushing may alternately be introduced into the membrane device via either/both membrane inlet and outlet means and permeating the flushing liquid through the membrane(s) into the annular region. Water is a convenient liquid suitable for flushing, although any liquid compatible with the membrane material may be used. The ion exchange or absorbent particles may alternately be removed from the annular region by sufficiently pressurizing the annular region with air, nitrogen, carbon dioxide, or other inert gas and thereby displacing the ion exchange or absorbent particles.

The ion exchange or absorbent particles may be regenerated in place by passing an appropriate regenerating liquid through the annular region containing the ion exchange or absorbent particles. The regenerating liquid used is dependent upon the application for which the device is used. For example, when metals such as nickel, lead, copper, zinc, cadmium, or chromium are absorbed by Chelex ® 100 ion exchange resin, a dilute acid solution such as hydrochloric acid may be used to remove the absorbed compounds and regenerate the Chelex ® ion exchange resin. When organics are absorbed by activated carbon, a solution of sodium hydroxide or an organic solvent may be used to remove the absorbed compounds and regenerate the activated carbon. The regenerating liquid solutions containing metal and/or organics thus contain significant concentrations of metals and/or organics compared to the feed water treated.

Feed water containing metals and/or organics is introduced into the membrane device via the inlet means located to the outside of the second microporous tubular membrane or the inside of the first microporous tubular membrane. The feed water may contain metals such as nickel, lead, copper, zinc, cadmium, chromium, and the like in concentrations up to their solubility limit in water. Typically, the concentration of such metals in industrial wastewater is betwen about 1 ppb and about 100 ppm. The feed water may contain organics such as volatile $C_{1-10}$ hydrocarbons, volatile $C_{1-8}$ halogenated hydrocarbons, and non-volatile organics such as pesticides in concentrations up to their solubility limit in water. Typically, the concentration of such organics in industrial wastewater is between about 0.1 and about 10,000 ppm. The feed water is introduced into the membrane device at temperatures and pressures which do not adversely affect the membrane materials and absorbent materials used. Preferred temperatures are between about 0° and about 80° C., more preferably between about 10° and about 60° C. Preferred feed pressures are between about 5 and about 100 psig, more preferably between about 15 and about 50 psig.

the feed water containing metals and/or organics permeates through the second/first microporous tubular membrane into the annular region formed by the first and second microporous tubular membranes. The pressure drop across the annular ion exchange or absorbent bed is preferably less than about 10 psig, more preferably less than about 5 psig. The metals and/or organics are absorbed by the ion exchange or absorbent particles. The water depleted in metals and/or organics then permeates through the first/second microporous tubular membrane and is withdrawn from the membrane device via the outlet means located to the inside of the first microporous tubular membrane or the outside of the second microporous tubular membrane.

The membrane device preferably removes at least about 50 weight percent of the metals and/or organics present in the feed water, more preferably at least about 75 weight percent. Such membrane devices may be connected in parallel or series depending upon the volume of water to be treated, the concentration of metals and/or organics in the feed water, and the degree of removal required.

DETAILED DESCRIPTION OF THE DRAWING

FIG. 1 illustrates a preferred embodiment of the membrane device of this invention. A first microporous tubular membrane (11) is situated concentrically within a second microporous tubular membrane (12), thus defining an annular region (13) between the two concentrically situated tubular membranes. The two tubular membranes are enclosed within a housing (14) comprising a case (15) and two endplates (16). Fine size ion exchange or absorbent particles (17) are disposed within the annular region (13) formed by the two concentrically situated tubular membranes. A first opening means for introducing a feed fluid/withdrawing a treated fluid (18) to/from the inside of the first tubular membrane (11) and a second opening means for withdrawing a treated fluid/introducing a feed fluid (19) from/to the outside of the second tubular membrane (12) is included within the device. Optional are inlet and outlet means (20) for flushing the annular region (13) formed by the first and second concentrically situated tubular membranes. Means of sealing the two tubular membranes to the inside surface of the housing (21) may be permanent or removable. Optional porous spacer(s) (22) may be used to help maintain uniform annular region (13) spacing.

SPECIFIC EMBODIMENTS

The following Example is intended for illustration only and is not meant to limit the scope of the invention or claims.

EXAMPLE 1

A concentric microporous tubular membrane device as illustrated in FIGS. 1a–1c constructed from two microporous polypropylene tubes of length about 7½ inches and nominal outside diameters of about 2 and about ⅝ inches. The microporous tubes possess a porosity of about 50 percent and pore size of about 20 microns. The concentric tubes are situated inside of a cylindrical housing fabricated from about a 7½ inch length of about 2¾ inch outside diameter Lucite tubing and two endplates. The microporous tubes are sealed against the housing by means of O-ring seals. The annular region formed by the two concentric microporous tubes possesses an inside radius of about 7/16 inch and an outside radius of about ¾ inch, resulting in a bed depth of about 5/16 inch with a bed volume of about 144 cm$^3$ of 325-200 mesh (44 to 74 micron) Chelex ® 100 ion exchange resin.

An aqueous feed solution containing about 4000 ppm NaCl, about 120 ppm calcium, about 24 ppm magnesium, and about 0.2 ppm each of nickel, lead, copper, zinc, and chromium at a pH of about 7 is passed through the device at a flowrate of about 0.5 gpm. After about 500 liters (about 4000 bed volumes) has passed through the device, the ion exchange resin continues to absorb over 80 percent of the metal species. Flow of the feed solution is stopped and the device is flushed with about 500 ml (about 4 bed volumes) of 1 N HCl to remove the absorbed compounds and regenerate the ion exchange resin.

What is claimed is:

1. A membrane separation device useful for carrying out an ion exchange or absorbent process comprising:

A. a housing comprising a case and two endplates;

B. a first microporous tubular membrane defining within it a volume region;

C. a second microporous tubular membrane wherein the first tubular membrane is concentrically situated inside the second tubular membrane such that a first annular region between the first and second tubular membranes is formed;

D. fine size ion exchange or absorbent particles having a size of between about 10 and 100 microns disposed within the first annular region formed by the first and second concentrically situated tubular membranes;

D'. a second annular region defined between the interior wall of the case and the exterior convex surface of the second microporous tubular membrane;

E. first opening means in fluid communication with said volume region within the first microporous tubular membrane for either introducing a feed fluid into the volume region or for withdrawing treated fluid from the volume region;

E'. second opening means in fluid communication with said second annular region for either introducing a fluid feed into the second annular region or for withdrawing treated fluid from the second annular region;

F. a means of sealing the first and second tubular membranes to the inside surface of the housing; and G. at least one porous spacer situated between the first and second concentrically situated tubular membranes.

2. The membrane separation device of claim 1 which further comprises:

H. a means for flushing the annular region formed by the first and second concentrically situated tubular membranes.

3. The membrane separation device of claim 2 wherein the sealing means is permanent.

4. The membrane separation device of claim 3 wherein the sealing means comprises an elastomer, a thermoplastic resin, or a thermoset resin.

5. The membrane separation device of claim 2 wherein the sealing means is removable.

6. The membrane separation device of claim 5 wherein the sealing means comprises an O-ring or gasket.

7. The membrane separation device of claim 6 wherein the first and second tubular membranes possess a porosity of between about 20 and about 80 percent.

8. The membrane separation device of claim 7 wherein the first and second tubular membranes possess a pore size in the range of from about 0.1 to about 50 microns.

9. The membrane separation device of claim 8 wherein the membranes possess a water flux at about 25° C. and 10 psig of at least about 3,000 GFD.

10. The membrane separation device of claim 9 wherein the annular region spacing formed by the first and second concentrically situated tubular membranes is between about 2 and about 50 millimeters.

11. A membrane separation process for treating water containing metals, organics, or mixtures thereof comprising:

A. introducing into a concentric tubular membrane device feed water containing metals, organics, or mixtures thereof via first or second opening means, wherein the concentric tubular membrane device comprises:
  (1) a housing comprising a case and two endplates,
  (2) a first microporous tubular membrane defining a volume region,
  (3) a second microporous tubular membrane wherein the first tubular membrane is concentrically situated inside of the second tubular membrane such that a first annular region between the first and second tubular membranes is formed,
  (4) fine size ion exchange or absorbent particles having a size of between about 10 and 100 microns disposed within the first annular region formed by the first and second concentrically situated tubular membranes,
  (5) a second annular region defined between the interior wall of the case and the convex exterior of the second microporous tubular membrane;
  (6) first opening means in fluid communication with said volume region within the first membrane for either introducing a feed fluid into the volume region or for withdrawing treated fluid from the volume region;
  (7) second opening means in fluid communication with said second annular region for either introducing fluid feed into the second annular region or for withdrawing treated fluid from the second annular region;
  (8) a means of sealing the first and second tubular membranes to the inside surface of the housing, and
  (9) at least one porous spacer situated between the first and second concentrically situated tubular membranes;

B. permeating the feed water containing metals, organics, or mixtures thereof through the second or first microporous tubular membrane into the first annular region formed between the first and second tubular membranes;

C. absorbing the metals, organics, or mixtures thereof into the fine size ion exchange or absorbent particles disposed within the first annular region;

D. permeating water depleted in metals, organics, or mixtures thereof through first or second, respectively, microporous tubular membrane; and E. withdrawing water depleted in metals, organics, or mixtures thereof from the concentric tubular membrane device via the respective first or second opening means.

12. The process of claim 11 in which the concentric tubular membrane device further comprises:
  (10) a means for flushing the annular region formed by the first and second concentrically situated tubular membranes.

13. The process of claim 12 wherein the sealing means in the concentric tubular membrane device is permanent.

14. The process of claim 13 wherein the sealing means comprises an elastomer, a thermoplastic resin, or a thermoset resin.

15. The process of claim 12 wherein the sealing means in the concentric tubular membrane device is removable.

16. The membrane separation device of claim 15 wherein the sealing means comprises an O-ring or gasket.

17. The process of claim 16 wherein the first and second tubular membranes possess a pore size in the range of from about 0.1 to about 50 microns.

18. The process of claim 17 wherein the membranes possess a water flux through the first and second tubular membranes at about 25° C. and 10 psig of at least about 3,000 GFD.

19. The process of claim 18 wherein the annual region spacing formed by the first and second concentrically situated tubular membranes is between about 2 and 50 millimeters.

20. The process of claim 19 wherein the temperature of the feed water is between about 0° and 90° C.

21. The process of claim 20 wherein the pressure of the feed water is between about 5 and about 100 psig.

22. The process of claim 21 wherein the fine particle ion exchange or absorbent particles possess a particle size of between about 20 and about 74 microns.

23. The process of claim 22 wherein the concentric tubular membrane device removes at least about 50 weight percent of the metals and/or organics present in the feed water.

* * * * *